(No Model.)

R. W. GORDON.
GALVANIC BATTERY.

No. 570,013. Patented Oct. 27, 1896.

Witnesses
Jas. J. Maloney.
J. P. Livermore

Inventor,
Ralph W. Gordon.
by Jno. P. Livermore
Atty.

THE NORRIS PETERS CO., PHOTO-LITHO., WASHINGTON, D. C.

UNITED STATES PATENT OFFICE.

RALPH W. GORDON, OF NEW YORK, N. Y., ASSIGNOR TO THE GORDON-BURNHAM BATTERY COMPANY, OF PORTLAND, MAINE, AND NEW YORK, N. Y.

GALVANIC BATTERY.

SPECIFICATION forming part of Letters Patent No. 570,013, dated October 27, 1896.

Application filed October 14, 1895. Serial No. 565,548. (No model.)

*To all whom it may concern:*

Be it known that I, RALPH W. GORDON, of New York, county of New York, State of New York, have invented an Improvement in Galvanic Batteries, of which the following description, in connection with the accompanying drawings, is a specification, like letters on the drawings representing like parts.

The present invention relates to a galvanic battery, and is embodied in a novel construction of a battery of the class shown and described in Patent No. 542,049, granted to me July 2, 1895. Such a battery consists mainly of a positive element of zinc and a negative element comprising a metallic receptacle having perforated walls and adapted to contain a depolarizing agent, preferably black oxid of copper in granular form, the said elements being immersed in an exciting fluid, preferably a solution of caustic soda, contained in a jar of any usual or suitable shape and material.

The present invention relates to the specific construction of a battery-cell and embodies a novel arrangement of the elements and the means for supporting them in proper relation to each other and to the jar which contains the exciting fluid.

In accordance with the present invention the negative element consists of a cylindrical metallic receptacle secured to a cover for the jar and having fastened to its sides a number of supports of insulating material, preferably porcelain, adapted to support a positive element of zinc, preferably in the form of an annular plate or band surrounding the positive element and concentric therewith, the insulating-supports being so constructed as to also separate the elements from each other and form a complete insulation.

Figure 1:
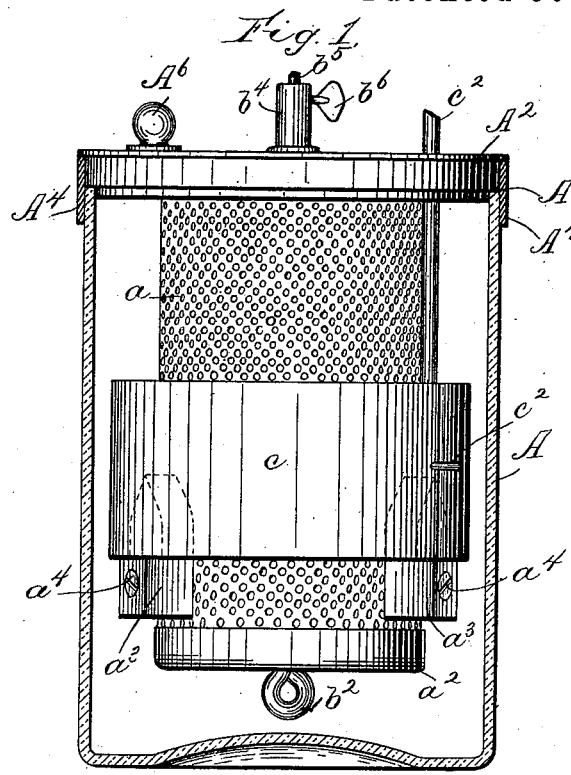
Figure 2:
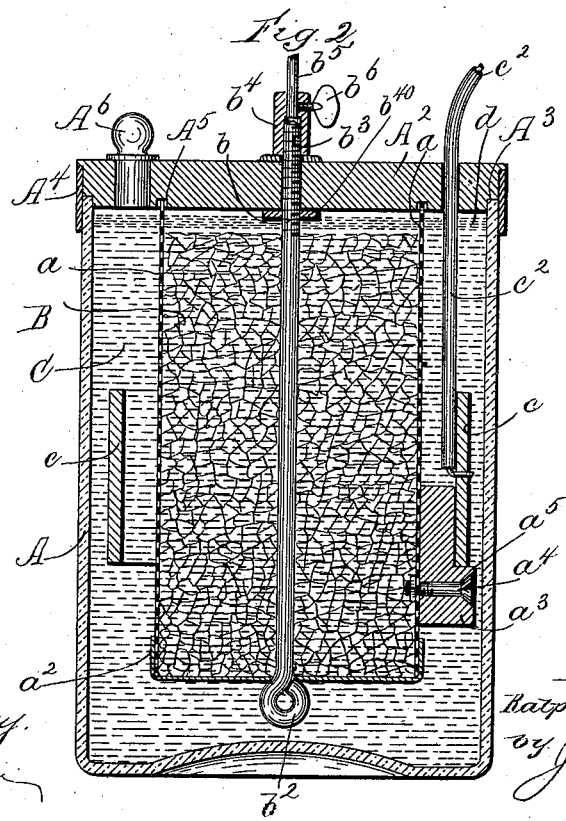

Figure 1 is a side elevation of the cover and the elements of the battery in their proper position with relation to the jar, said jar being shown in section; and Fig. 2 is a vertical section of the battery-cell, the section being taken through one of the supports for the positive element.

The jar A, which is preferably of glass, is provided with a cover $A^2$, of any suitable insulating material—such as wood or hard rubber—which is preferably provided with a shoulder $A^3$, resting on the edges of the jar, while a portion of the cover extends into the mouth of the jar, as shown, in order to secure a proper fit between the parts.

A band $A^4$, of resilient material, such as rubber, is preferably stretched around the jar and cover after the said cover is placed in position, in order to make a substantially tight joint between the two.

The negative element $a$ is shown as a metallic receptacle having perforated walls and secured to the said cover, extending downward therefrom toward the bottom of the jar, the said element being preferably constructed, as shown, with a removable bottom portion $a^2$, fitting like a cover over the lower end of the cylinder, and thus closing the same to form a receptacle for the depolarizing agent B, Fig. 2, usually black oxid of copper, which is contained therein. The said element is preferably secured to the cover by means of a rod $b$, passing upward through an opening in the bottom piece $a^2$ and having an enlargement or head $b^2$ to support the said bottom piece and the cylinder contained therein. The said rod is extended upward through a central opening in the cover and provided at its end with the threaded portion $b^3$, upon which is screwed a nut or socket $b^4$, which rests on the cover around the said opening, thus supporting the rod and the element $a$. The rod $b$ also serves as a conductor to the positive pole of the battery, the socket $b^4$ serving as a binding-post to hold the external conductor $b^5$, and being provided with a thumb-screw $b^6$ for the purpose. In order to secure the said element firmly against lateral movement with relation to the cover, the said cover is preferably provided on its lower surface with an annular recess $A^5$, into which extends the upper edge of the cylinder, which forms the element $a$, so that when said cylinder is in place and drawn up by the rod $b$ the parts are firmly secured together. A lock-nut $b^{10}$ is also preferably secured on the rod $b$ and adapted to bear against the under side of the cover.

The positive element $c$ consists, in accordance with the present invention, in an annular plate or cylinder of zinc supported on the insulating-supports $a^3$, which consist, preferably, of blocks of porcelain secured by bolts or screws $a^4$ to the walls of the receptacle $a$. The said blocks are provided with shoulders $a^5$, upon which rests the lower edge of the element $c$, a portion of the block extending upward from said shoulders, the thickness thereof being substantially equal to the difference between the outer diameter of the negative element and the inner diameter of the positive element, so that the two are separated and insulated thereby. The positive element is connected to the external circuit by means of a conductor $c^2$, which may be electrically connected with said element in any suitable way, as, for example, being passed through openings in said element, as indicated in Fig. 1. The said element is preferably formed, as indicated, of a plate bent around until its ends nearly meet, thus forming a cylinder, and the openings through which the conductor is passed are in the adjacent ends of said plate.

When the parts above described have been properly assembled, the receptacle $a$ having been filled with black oxid of copper the jar is nearly filled with an exciting fluid C and preferably hermetically sealed by pouring on the surface of the said exciting fluid a thin layer of oil $d$ to exclude the air from the active parts of the battery.

The cover A is preferably provided with an opening having a stopper $A^6$, through which the exciting fluid may be poured, if desired.

I claim—

1. The combination of a jar, a permeable negative element suspended therein and adapted to contain a depolarizing agent, a positive element, and insulating-supports for said positive element secured to the walls of the negative element and projecting therefrom and interposed between and supporting the positive element, substantially as described.

2. The combination with a jar containing an exciting fluid, of a cover for the said jar; a negative element comprising a cylinder having perforated walls and adapted to contain a depolarizing agent, a rod secured to the bottom of said cylinder and extending upward therefrom through the said cover, and secured on the outside thereof; a positive element consisting of a cylinder of zinc concentric with said negative element, and insulating-supports secured to the negative element, said supports having shoulders upon which the positive element is supported and a portion above said shoulders interposed between said elements, substantially as described.

In testimony whereof I have signed my name to this specification in the presence of two subscribing witnesses.

RALPH W. GORDON.

Witnesses:
GEORGE A. JOHNSON,
WM. C. BELINKE.